(12) United States Patent
James

(10) Patent No.: US 11,788,468 B1
(45) Date of Patent: Oct. 17, 2023

(54) ENGINE CASE LEAKAGE MITIGATION HEAT EXCHANGER

(71) Applicant: Raytheon Technologies Corporation, Farmington, CT (US)

(72) Inventor: Robert James, Middletown, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/101,735

(22) Filed: Jan. 26, 2023

(51) Int. Cl.
   *F02C 7/141* (2006.01)
   *F02C 7/18* (2006.01)

(52) U.S. Cl.
   CPC ............... *F02C 7/141* (2013.01); *F02C 7/18* (2013.01); *F05D 2240/14* (2013.01); *F05D 2260/213* (2013.01); *F05D 2260/232* (2013.01); *F05D 2260/602* (2013.01)

(58) Field of Classification Search
   CPC ........ F02C 7/141; F02C 7/18; F05D 2240/14; F05D 2260/213; F05D 2260/232; F05D 2260/602
   See application file for complete search history.

(56) References Cited

U.S. PATENT DOCUMENTS 4,316,500 A    2/1982    Gentry et al.

FOREIGN PATENT DOCUMENTS

| CN | 109261962 A | | 1/2019 | |
| CN | 112496522 A | | 3/2021 | |
| CN | 113351984 A | | 9/2021 | |
| EP | 933610 A1 | | 8/1999 | |
| EP | 3190271 A1 | * | 7/2017 | ............. F01D 25/12 |
| WO | 2010041945 A2 | | 4/2010 | |

\* cited by examiner

*Primary Examiner* — Mickey H France
(74) *Attorney, Agent, or Firm* — Bachman & LaPointe, P.C.

(57) ABSTRACT

A heat exchanger for controlling case leakage including a joint formed between a first case portion proximate a second case portion; a gap formed within the joint; and the heat exchanger operatively coupled to the case proximate the joint, the heat exchanger configured to inhibit air flow through the gap.

19 Claims, 2 Drawing Sheets

ENGINE CASE LEAKAGE MITIGATION HEAT EXCHANGER

BACKGROUND

The disclosure relates to a heat exchanger structure to be co-optimized for heat transfer and structural applications. Particularly the modification can include strategic placement of the heat exchanger structure to harness available heat transfer working fluid and waste heat recovery as well as minimize duct leakage.

Engine case assemblies are prone to airflow leakage escaping from the inside of the engine ducts to the external environment. This phenomenon is driven by the presence of, relative to ambient conditions, heated and pressurized air inside the engine and minor gaps existing between engine case parts in the assembled state. The loss of processed air leads to non-favorable engine performance impacts and air impingements on external-to-engine components.

Engine thermal management systems (TMS) make use of the pressurized duct air as a heat sink for various applications. Heat is transferred to and from various fluids via heat exchangers (HEX). The generality of these devices is such that location, contained fluids, and shape can be manipulated to fit a variety of needs. Additionally, as-installed HEX outer physical profiles grow during operation (relative to ambient conditions) due to a common phenomenon by which materials expand when heated. Given that all fluids involved ("hot" and "cold") are significantly hotter than ambient conditions, engine HEX are commonly in an expanded state during engine operation.

Traditionally heat exchangers in gas turbine engines have been designed to hold pressure of the working fluid and to react to thermal stresses.

What is needed is a heat exchanger that can perform both the transfer of thermal energy as well as provide airflow leakage control for the gas turbine engine.

SUMMARY

In accordance with the present disclosure, there is provided a heat exchanger for controlling case leakage comprising a joint formed between a first case portion proximate a second case portion; a gap formed within the joint; and the heat exchanger operatively coupled to the case proximate the joint, the heat exchanger configured to inhibit air flow through the gap.

A further embodiment of any of the foregoing embodiments may additionally and/or alternatively include the heat exchanger is co-optimized for heat transfer and leakage control.

A further embodiment of any of the foregoing embodiments may additionally and/or alternatively include the heat exchanger is located within an air stream within an interior of the case.

A further embodiment of any of the foregoing embodiments may additionally and/or alternatively include the heat exchanger inhibits air flow through the gap as well as being configured with a heat transfer function of a first working fluid and a second working fluid.

A further embodiment of any of the foregoing embodiments may additionally and/or alternatively include the heat exchanger is operatively coupled to at least one of the first case portion and the second case portion.

A further embodiment of any of the foregoing embodiments may additionally and/or alternatively include the heat exchanger is selected from the group consisting of an air-oil cooler; a buffer heat exchanger with air-air in duct or fuel-air working fluids.

A further embodiment of any of the foregoing embodiments may additionally and/or alternatively include the heat exchanger being employed across the gap.

In accordance with the present disclosure, there is provided a heat exchanger for controlling case leakage in a gas turbine engine comprising a joint formed between a first case portion proximate a second case portion; a gap formed within the joint; the heat exchanger operatively coupled to the case proximate the joint, the heat exchanger configured to inhibit air flow through the gap; and a first working fluid fluidly coupled to the heat exchanger and a second working fluid fluidly coupled to the heat exchanger.

A further embodiment of any of the foregoing embodiments may additionally and/or alternatively include the heat exchanger is co-optimized for heat transfer and leakage control.

A further embodiment of any of the foregoing embodiments may additionally and/or alternatively include the heat exchanger is located within an air stream within an interior of the case.

A further embodiment of any of the foregoing embodiments may additionally and/or alternatively include the heat exchanger is positioned to inhibit air flow through the gap as well as being configured with a heat transfer function of the first working fluid and the second working fluid.

A further embodiment of any of the foregoing embodiments may additionally and/or alternatively include the heat exchanger spans across the gap.

A further embodiment of any of the foregoing embodiments may additionally and/or alternatively include the heat exchanger is configured to impede the air leakage through the gap.

In accordance with the present disclosure, there is provided a process for combined heat transfer and controlling case leakage in a gas turbine engine comprising forming a joint between a first case portion proximate a second case portion; forming a gap within the joint; and operatively coupling the heat exchanger to the case proximate the joint; and inhibiting air flow through the gap with the heat exchanger.

A further embodiment of any of the foregoing embodiments may additionally and/or alternatively include the process further comprising co-optimizing the heat exchanger for heat transfer and leakage control.

A further embodiment of any of the foregoing embodiments may additionally and/or alternatively include the process further comprising fluidly coupling a first working fluid to the heat exchanger; and fluidly coupling a second working fluid to the heat exchanger.

A further embodiment of any of the foregoing embodiments may additionally and/or alternatively include the process further comprising locating the heat exchanger within an air stream within an interior of the case.

A further embodiment of any of the foregoing embodiments may additionally and/or alternatively include the process further comprising reaching an operation temperature in the heat exchanger responsive to the gas turbine engine operation; and exhibiting a dimensional change due to thermal expansion.

A further embodiment of any of the foregoing embodiments may additionally and/or alternatively include the process further comprising spanning the heat exchanger across the gap.

Other details of the heat exchanger are set forth in the following detailed description and the accompanying drawings wherein like reference numerals depict like elements.

DETAILED DESCRIPTION

Figure 1:
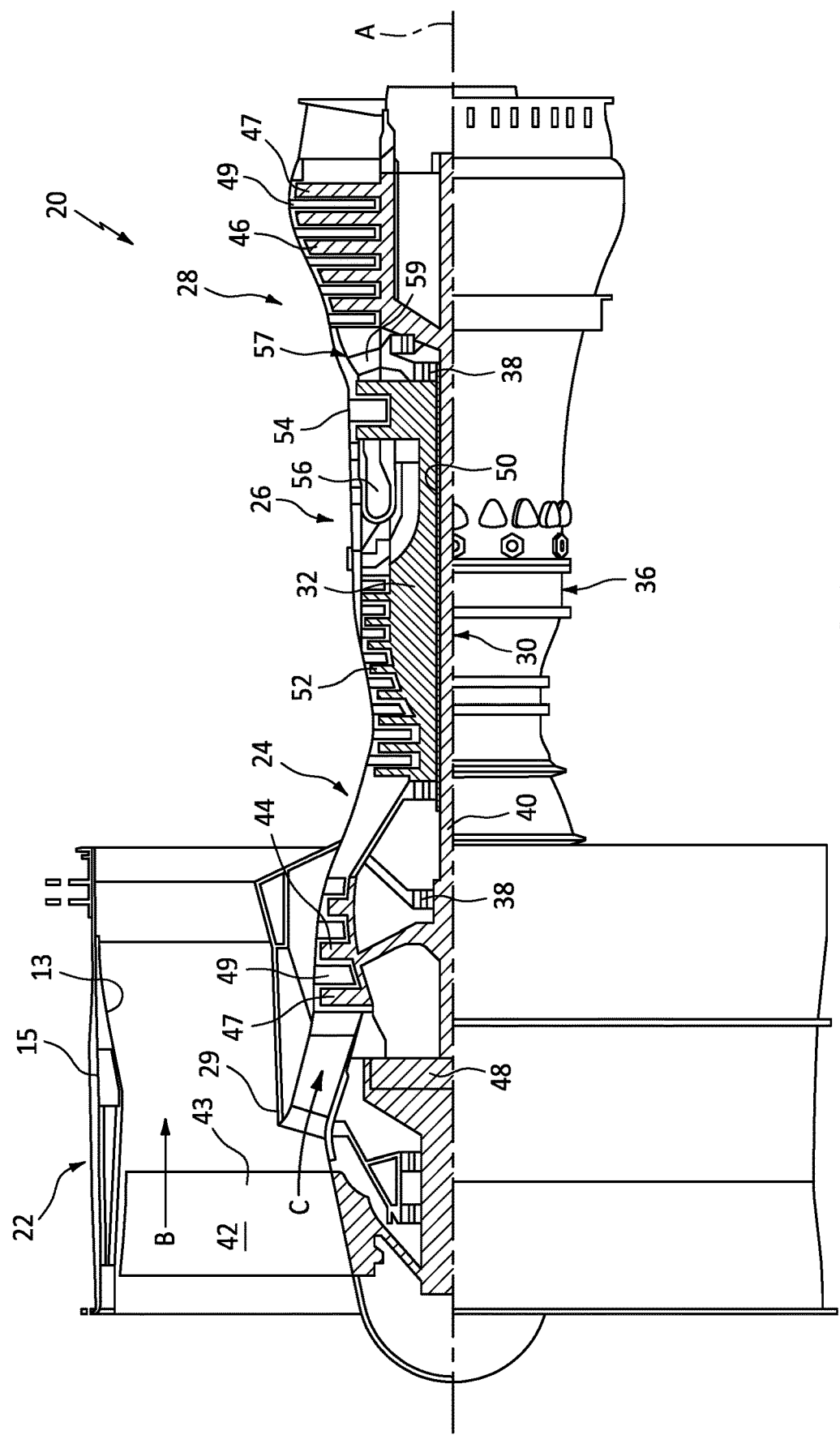
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(Tram\ °\ R)/(518.7°\ R)]°\ 5$. The "low corrected fan tip speed" can be less than or equal to 1150.0 ft/second (350.5 meters/second), and greater than or equal to 1000.0 ft/second (304.8 meters/second).

Figure 2:
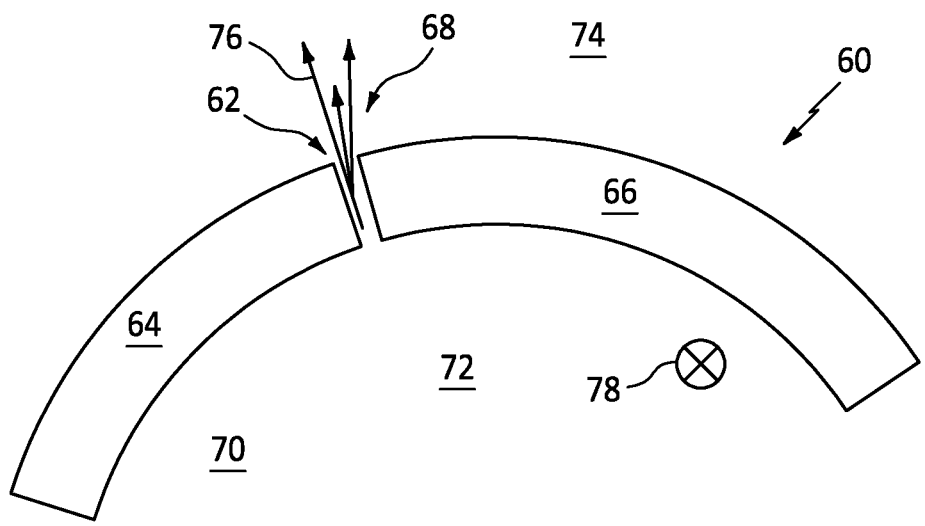
FIG. 2 is a schematic representation of exemplary gas turbine engine case.
Figure 3:
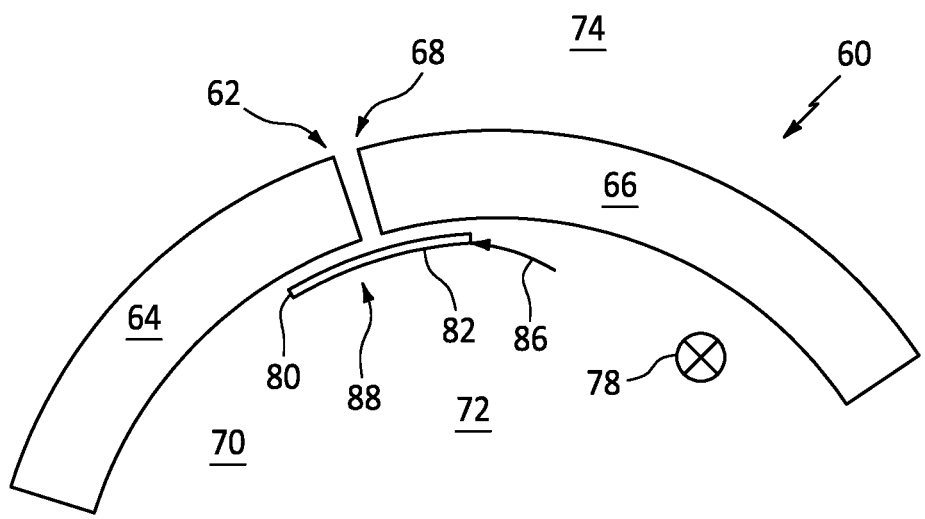
FIG. 3 is a schematic representation of an exemplary heat exchanger strategically placed to control case leakage.
Figure 4:
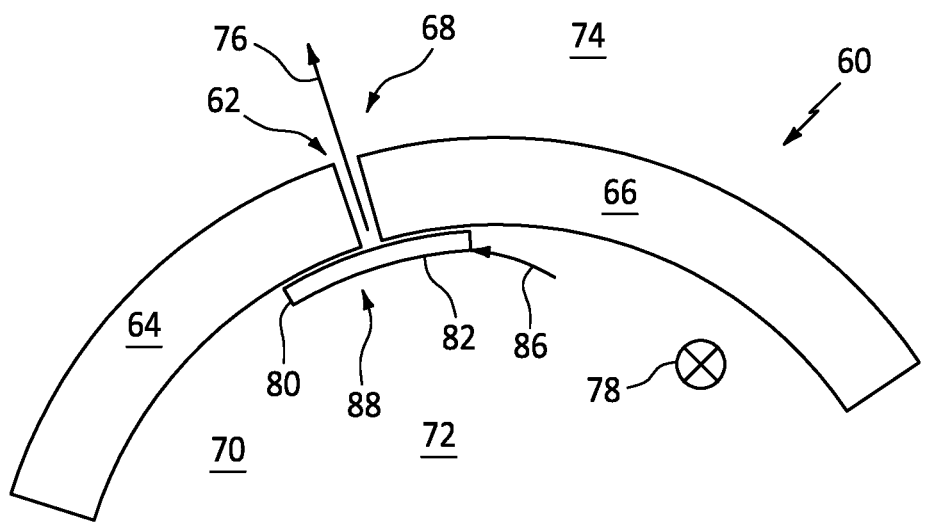
FIG. 4 is a schematic representation of an exemplary heat exchanger strategically placed to control case leakage.

Referring to FIG. 2 an exemplary engine case 60 is shown. The engine case 60 includes a joint 62 that defines a union of a first portion 64 and a second portion 66 of the engine case 60. There is a gap 68 within the joint 62 that allows engine air 70 within the case interior 72 to leak out through the gap 68 to the case exterior 74, such as the external environment. The air leakage 76 shown by arrows is unwanted. The case interior 72 can be a duct that flows engine air 70, with a flow direction 78 out of the page.

During standard engine operation, the gap 68 in the engine case 60 allows for a certain quantity of air leakage 76. Strategic placement of a heat exchanger 80 proximate the joint 62 can minimize the air leakage 76.

The heat exchanger 80 can include a body 82 with a heat exchanger exterior 84. The heat exchanger exterior 84 can be coupled to the first portion 64 and/or to the second portion 66 of the case 60. The heat exchanger 80 can span across the gap 68 and be configured to impede the air leakage 76 through the gap 68 at the joint 62.

When the engine 20 is not in operation the heat exchanger 80 is at an ambient temperature, there should not be duct air flow 78, and thus no air leakage 76. When the engine 20 is in operation, the heat exchanger 80 reaches an operation temperature and exhibits dimensional changes due to thermal expansion. The heat exchanger 80 becomes expanded and closes and reduces the pathway for air leakage 76. Even though there is air flow in the interior 72, the leakage is reduced and minimized due to the change in dimensions of the heat exchanger 80. The heat exchanger 80 can also utilize the air 70 for heat transfer purposes.

In an exemplary embodiment, the heat exchanger 80 can be fluidly coupled to a first working fluid 86 and a second working fluid 88, such as the duct air flow 78. The heat exchanger is co-optimized for heat transfer and leakage control. In an exemplary embodiment, the heat exchanger 80 can be selected from the group consisting of an air-oil cooler; a buffer heat exchanger with air-air in duct or fuel-air working fluids 86,88.

A technical advantage of the disclosed heat exchanger includes performing both the transfer of thermal energy as well as providing structural control of airflow leakage for the gas turbine engine.

Another technical advantage of the disclosed heat exchanger can include the reduction of engine case leakage by positioning the heat exchanger proximate to a leakage location.

Another technical advantage of the disclosed heat exchanger can include the heat exchanger is installed such that the ambient temperature material does not create an effective seal; however, during operation the growth of the heat exchanger decreases the effective leakage area and utilizes the otherwise leaked airflow for cooling purposes.

Another technical advantage of the disclosed heat exchanger can include utilizing predicted thermal growth of the heat exchanger to ameliorate and utilize overboard leakage.

Another technical advantage of the disclosed heat exchanger can include reducing the amount of overboard flow which is inherently beneficial to engine performance and the nacelle environment of operational engines.

Another technical advantage of the disclosed heat exchanger can include supplanting the gamut of currently-understood TMS cooling locations and advances the number of production-viable architectures for future system needs.

There has been provided a heat exchanger. While the heat exchanger has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A heat exchanger for controlling case leakage comprising:
   a joint formed between a first case portion proximate a second case portion;
   a gap formed within the joint; and
   the heat exchanger operatively coupled to the case proximate the joint, the heat exchanger configured to inhibit air flow through the gap.

2. The heat exchanger for controlling case leakage according to claim 1, wherein the heat exchanger is co-optimized for heat transfer and leakage control.

3. The heat exchanger for controlling case leakage according to claim 1, wherein the heat exchanger is located within an air stream within an interior of the case.

4. The heat exchanger for controlling case leakage according to claim 3, wherein the heat exchanger inhibits air flow through the gap as well as being configured with a heat transfer function of a first working fluid and a second working fluid.

5. The heat exchanger for controlling case leakage according to claim 1, wherein the heat exchanger is operatively coupled to at least one of the first case portion and the second case portion.

6. The heat exchanger for controlling case leakage according to claim 1, wherein the heat exchanger is selected from the group consisting of an air-oil cooler; a buffer heat exchanger with air-air in duct or fuel-air working fluids.

7. The heat exchanger for controlling case leakage according to claim 1, wherein the heat exchanger is employed across the gap.

8. A heat exchanger for controlling case leakage in a gas turbine engine comprising:
   a joint formed between a first case portion proximate a second case portion;
   a gap formed within the joint;

the heat exchanger operatively coupled to the case proximate the joint, the heat exchanger configured to inhibit air flow through the gap; and a first working fluid fluidly coupled to the heat exchanger and a second working fluid fluidly coupled to the heat exchanger.

9. The heat exchanger for controlling case leakage in a gas turbine engine according to claim 8, wherein the heat exchanger is co-optimized for heat transfer and leakage control.

10. The heat exchanger for controlling case leakage in a gas turbine engine according to claim 8, wherein the heat exchanger is located within an air stream within an interior of the case.

11. The heat exchanger for controlling case leakage in a gas turbine engine according to claim 8, wherein the heat exchanger is positioned to inhibit air flow through the gap as well as being configured with a heat transfer function of the first working fluid and the second working fluid.

12. The heat exchanger for controlling case leakage in a gas turbine engine according to claim 8, wherein the heat exchanger spans across the gap.

13. The heat exchanger for controlling case leakage in a gas turbine engine according to claim 8, wherein the heat exchanger is configured to impede the air leakage through the gap.

14. A process for combined heat transfer and controlling case leakage in a gas turbine engine comprising:

forming a joint between a first case portion proximate a second case portion;

forming a gap within the joint; and operatively coupling the heat exchanger to the case proximate the joint; and inhibiting air flow through the gap with the heat exchanger.

15. The process of claim 14, further comprising:

co-optimizing the heat exchanger for heat transfer and leakage control.

16. The process of claim 14, further comprising:

fluidly coupling a first working fluid to the heat exchanger; and fluidly coupling a second working fluid to the heat exchanger.

17. The process of claim 14, further comprising:

locating the heat exchanger within an air stream within an interior of the case.

18. The process of claim 14, further comprising:

reaching an operation temperature in the heat exchanger responsive to the gas turbine engine operation; and exhibiting a dimensional change due to thermal expansion.

19. The process of claim 14, further comprising:

spanning the heat exchanger across the gap.

\* \* \* \* \*